Oct. 31, 1950
T. W. PEACOCK
2,528,170
STUMP DOZER
Filed April 11, 1946
2 Sheets-Sheet 1
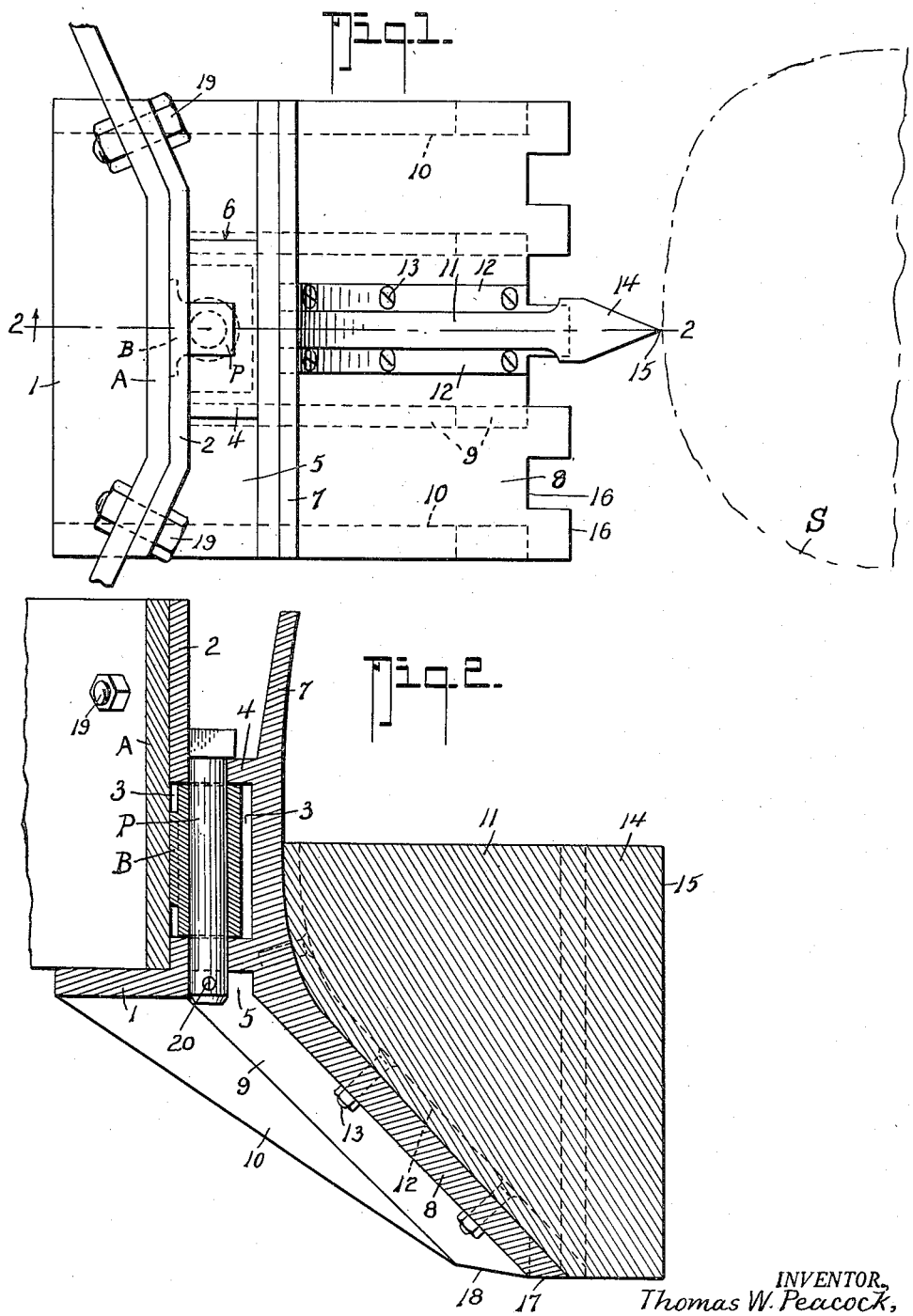
INVENTOR,
Thomas W. Peacock,
BY
Albert E. Dieterich,
ATTORNEY.

Oct. 31, 1950     T. W. PEACOCK     2,528,170
STUMP DOZER
Filed April 11, 1946     2 Sheets-Sheet 2
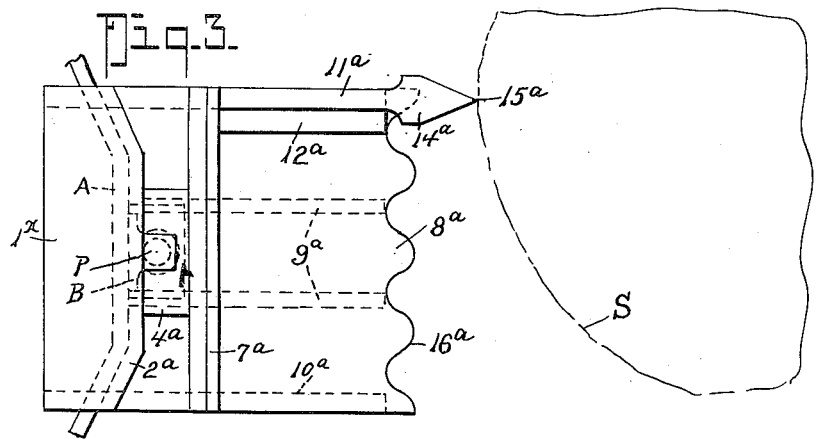
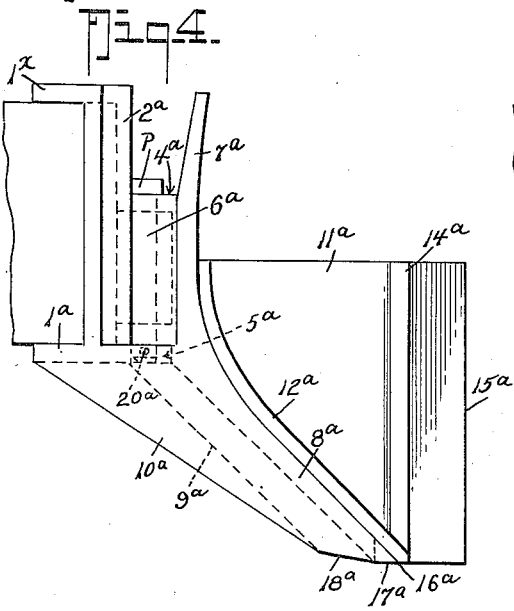
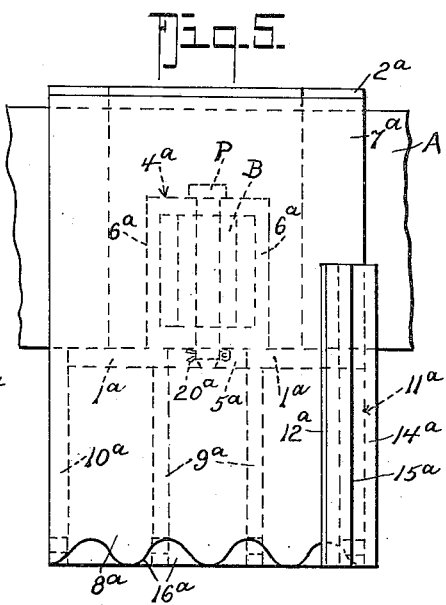
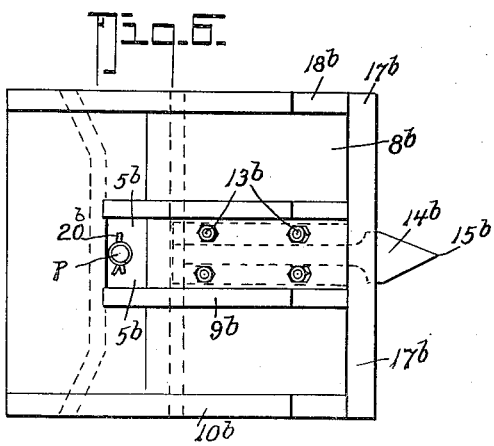
INVENTOR,
Thomas W. Peacock,
BY
Albert E. Dieterich
ATTORNEY.

Patented Oct. 31, 1950

2,528,170

UNITED STATES PATENT OFFICE 2,528,170

STUMP DOZER

Thomas W. Peacock, Jacksonville, Fla., assignor of one-half to Franklin G. Russell and one-fourth to George W. Peacock, Sr., both of Jacksonville, Fla.

Application April 11, 1946, Serial No. 661,456

9 Claims. (Cl. 37—2)

My invention relates to apparatus for removing stumps from the ground and it particularly has for its objects:

1. To provide a detachable stump dozer and splitter for use on track type bulldozers and the like used for clearing the land.

2. To provide a stump splitter and stump remover that will fit on the center king pin of the A-frame of a bulldozer after the bulldozer or track-type tractor blade has been removed.

3. To provide a stump dozer the bottom or leading edge of whose blade is so shaped as to keep the machine from slipping off the stump.

4. To provide a unit that is demountable and small enough in size that it will not require a large truck to handle it.

5. To provide a stump dozer unit having a stump-splitting wedge secured to the body of the unit by bolting, welding or forming the parts integrally, the wedge having a vertically disposed splitting edge which will contact the stump the full length, even below the ground level of the stump, a wedge that will split the whole stump, not just knock off a sliver.

6. To provide a splitter that can be located in the middle of the unit, or it may be mounted at one side of the body or blade so that with very large stumps (3' in diameter) one-half of the stump may be split off and removed at a time.

7. To provide a stump dozer and splitter whose splitting wedge is located in advance of the pushing blade so as to enter and split the stump before the pushing blade takes it out.

Other objects will in part be obvious and in part be pointed out hereinafter.

To the attainment of the aforesaid objects and ends, invention further resides in those novel details of construction, combinations and arrangements of parts all of which will be first fully described hereinafter and then be specifically pointed out in the appended claims, reference being had to the accompanying drawings in which:

Fig. 1 is a top plan view of one embodiment of the invention.

Fig. 2 is a vertical section of the same on the line 2—2 of Fig. 1.

Fig. 3 is a top plan view of another embodiment of the invention.

Fig. 4 is a side elevation of the same.

Fig. 5 is a front elevation of the same.

Fig. 6 is an inverted plan view showing the embodiment of Fig. 1 but with a straight-edge blade instead of the square-cut blade shown in Fig. 1.

In the drawings in which like numerals and letters of reference indicate like parts in all the figures, A represents the middle part of the A-frame of a track-type tractor or bulldozer, B the center bracket of the same and P the king pin.

The attachment comprising the present invention includes a bracket base-portion 1 to fit under the A-frame and a front bracket portion 2 to fit against the front face of the A-frame to which it may be bolted, as at, 19 if desired. The front portion 2 of the bracket has a cut-out or opening leading into a pocket 3 formed by the forward extension of the bottom plate 1, the portion 2, side walls 6, top 4 and vertical wall 7 of the blade. This pocket 3 receives the bracket B and a king pin P secures the attachment to the bracket B and against the A-frame.

The stump extracting blade 8 is downwardly-forwardly inclined from and is formed integrally with the vertical wall 7. Its bottom or cutting edge may be straight, as at 17$^b$ Fig. 6, square-cut serrated, as at 16 Fig. 1, wavy cut, as at 16$^a$ in Figs. 3 and 5, or of any other suitable and desired form so long as it will prevent the blade slipping off the stump S. The forward extension of the bottom 1 of the bracket has a recess 5 into which the lower end of the king pin P projects to receive a cotter pin or key 20, 20$^a$ or 20$^b$ as the case may be. The blade 8 is suitably braced by means of side and intermediate ribs 10 and 9 respectively. The bottom edges of the ribs 9, 10, incline upwardly rearwardly as at 18.

To the front of the blade is suitably mounted (by bolts 13, welding, or casting integral) a stump splitter consisting of a vertical wedge 14 having a sharp penetrating edge 15, a web 11 and a mounting flange or flanges 12.

When unusually large stumps are to be removed a stump dozer and splitter unit such as shown for instance in Figs. 3, 4 and 5, i. e. a unit having the splitting wedge mounted at one side, may be used. In Figs. 3, 4 and 5 those parts of the invention which are of the same construction or perform the same functions as similar parts in Figs. 1 and 2 bear the same reference numbers plus the index letter $a$ while those in Fig. 6 have the index letter $b$ added. Therefore a repetition of the description of those parts shown in Figs. 3 to 6 inclusive will be unnecessary.

Uses of the invention

The practice in Florida, when clearing land, is to cut down the trees to approximately ground level. When the contractor wants to clear a large tract of land on which there are low spots, hills, stumps, and trees, he uses a tractor with blade to fill and grade. To remove the stumps has always been a problem. My unit is made to fill the need of the contractor who requires an extra tool to do a special job. The standard blade of his bulldozer is demounted from the A-frame and my unit is substituted. This takes about one-half to one hour. The stump is then pushed out, much in the same manner that a hog roots. The blade goes down under the stump and then as the machine pushes forward, the unit is moved up by the cable or hydraulic power unit (not shown) operating the A-frame on the tractor. The stump is then left on top of the ground and is either pulled or pushed to the burning pile or loaded onto a truck for sale.

Some of these stumps are so large that a dump truck cannot haul them. For this reason, I have provided the splitting wedge device mounted to the pusher so that the stump is in smaller pieces when it has been removed from the ground, thus facilitating handling.

It is to be noted that my unit is especially designed for use with standard equipment of track-type tractors.

From the foregoing description taken in connection with the accompanying drawings it is thought the construction, uses, operation and advantages of the invention will be clear to those skilled in the art to which it appertains.

What I claim is:

1. In a bulldozer having an A-frame; a bracket consisting of a base portion and a vertical wall the wall in plan view being shaped to conform to and fit the front of the A-frame of the bulldozer; a body which includes a vertical front wall and a stump-extracting blade extending forwardly-downwardly from said bracket and carried thereby, and longitudinal bracing webs connecting the undersides of said bracket and said blade; and means to secure said bracket to the A-frame of the bulldozer.

2. An attachment for bulldozers having a blade-carrying frame, said attachment comprising: a bracket to fit on the front portion of said frame and including a base portion for fitting under said frame and a vertical wall to fit the front wall of said blade-carrying frame, said frame having a king-pin bracket and said vertical wall having a recess to receive said king-pin bracket; a king pin connecting said first mentioned bracket to said king-pin bracket; and a stump-removing blade formed integrally with said bracket and extending forwardly-downwardly therefrom and having a cutting edge.

3. The attachment of claim 2 wherein said cutting edge is serrated.

4. The attachment of claim 2 in combination with a stump splitter mounted on said stump-removing blade and including a vertically disposed splitting wedge.

5. The attachment of claim 2 in combination with a stump splitter mounted on said stump-removing blade and including a vertically disposed splitting wedge whose penetrating edge lies in advance of the penetrating edge of the cutting blade.

6. The attachment of claim 2 in combination with a stump splitter mounted on said stump-removing blade and including a vertically disposed splitting wedge, said splitter being removably bolted to said stump-removing blade.

7. The attachment of claim 2 in combination with a stump splitter mounted on said stump-removing blade and including a vertically disposed splitting wedge and a vertical web having at least one flange fitting said stump-removing blade.

8. In combination with the A-frame of a track type bulldozer tractor which frame has a center king-pin bracket: an attachment which includes a bracket having a front wall portion, a base portion and a top portion, said portions being shaped to receive and fit over the front mid-portion of said A-frame; a stump dozer blade which includes a vertical wall spaced in advance of said bracket and united to the same, there being a recessed body located between said front wall portion and said vertical wall, said front wall portion having an opening into said recess, the A-frame king-pin bracket being adapted to enter said recess; a king pin passing through holes in said recessed body and said king-pin bracket to hold the bracket on the A-frame in place.

9. In combination with the A frame of a track type bulldozer tractor which frame has a center king-pin bracket: an attachment which includes a bracket having a front wall portion, a base portion and a top portion, said portions being shaped to receive and fit over the front mid-portion of said A-frame; a stump dozer blade which includes a vertical wall spaced in advance of said bracket and united to the same, there being a recessed body located between said front wall portion and said vertical wall, said front wall portion having an opening into said recess, the A-frame king-pin bracket being adapted to enter said recess; a king pin passing through holes in said recessed body and said king-pin bracket to hold the bracket on the A-frame in place and a stump splitter having a vertical web and a wedge; means to secure said splitter to said stump dozer blade with the penetrating edge of the wedge located in front of the penetrating edge of the stump dozer blade.

THOMAS W. PEACOCK.

REFERENCES CITED

The following references are of record in the file of this patent:

UNITED STATES PATENTS

| Number | Name | Date |
| --- | --- | --- |
| 2,187,707 | Kane | Jan. 16, 1940 |